United States Patent
Dela Torre et al.

(10) Patent No.: US 11,532,452 B2
(45) Date of Patent: Dec. 20, 2022

(54) PROTECTION DEVICE WITH LASER TRIMMED FUSIBLE ELEMENT

(71) Applicant: Littelfuse, Inc., Chicago, IL (US)

(72) Inventors: P-A-Homer II Dela Torre, Chicago, IL (US); Roel Santos Retardo, Chicago, IL (US); Kent Harvey Mercado Berenguel, Chicago, IL (US)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 17/212,769

(22) Filed: Mar. 25, 2021

(65) Prior Publication Data

US 2022/0310346 A1 Sep. 29, 2022

(51) Int. Cl.
*H01H 85/143* (2006.01)
*H01H 85/20* (2006.01)

(52) U.S. Cl.
CPC .......... *H01H 85/143* (2013.01); *H01H 85/20* (2013.01)

(58) Field of Classification Search
CPC .... H01H 85/046; H01H 85/055; H01H 85/08; H01H 85/10; H01H 85/12; H01H 85/143; H01H 85/20
See application file for complete search history.

(56) References Cited

U.S. PATENT DOCUMENTS

| | | | | |
|---|---|---|---|---|
| 5,479,147 A * | 12/1995 | Montgomery | ..... | H01H 85/0411 337/273 |
| 5,659,284 A * | 8/1997 | Olofsson | ..... | H05K 1/0293 337/290 |
| 6,034,589 A * | 3/2000 | Montgomery | ..... | H01H 85/0411 337/296 |
| 6,710,699 B2 * | 3/2004 | Kaltenborn | ..... | H01H 85/046 337/273 |
| 2004/0184211 A1 * | 9/2004 | Bender | ..... | H01H 85/0047 361/104 |
| 2005/0141164 A1 * | 6/2005 | Bender | ..... | H01H 85/0047 361/104 |
| 2006/0170528 A1 * | 8/2006 | Fukushige | ..... | H01H 85/046 337/297 |
| 2008/0036036 A1 * | 2/2008 | Wada | ..... | H01L 27/0802 257/536 |
| 2010/0245028 A1 * | 9/2010 | Washizaki | ..... | H01H 85/08 337/297 |
| 2011/0063070 A1 * | 3/2011 | Dietsch | ..... | H01H 85/0411 337/290 |
| 2013/0234822 A1 * | 9/2013 | Aurich | ..... | H01H 37/32 337/416 |

(Continued)

FOREIGN PATENT DOCUMENTS

FR 2287102 A1 4/1976

OTHER PUBLICATIONS

Extended European Search Report dated Aug. 3, 2022 for EPO Application No. 22164128.5.

*Primary Examiner* — Jacob R Crum
(74) *Attorney, Agent, or Firm* — KDB Firm PLLC

(57) ABSTRACT

Provided are trimmed parallel element protection devices. Some protection devices may include a substrate and first and second terminals at opposite ends of the substrate. The protection devices may further include a first fusible and a second fusible element extending between the first and second terminals, wherein at least one of the first and second fusible elements includes a trimmed portion.

14 Claims, 10 Drawing Sheets

(56) References Cited

U.S. PATENT DOCUMENTS

| | | | |
|---|---|---|---|
| 2014/0061852 A1* | 3/2014 | Newberry | H01H 85/046 |
| | | | 257/529 |
| 2017/0040136 A1* | 2/2017 | Straub | H01H 85/06 |
| 2017/0365434 A1 | 12/2017 | Douglass et al. | |
| 2018/0366293 A1* | 12/2018 | Pineda | H01H 85/055 |
| 2019/0051573 A1* | 2/2019 | Katakura | H01L 23/53271 |
| 2021/0257174 A1* | 8/2021 | Chiu | H05K 1/111 |

\* cited by examiner

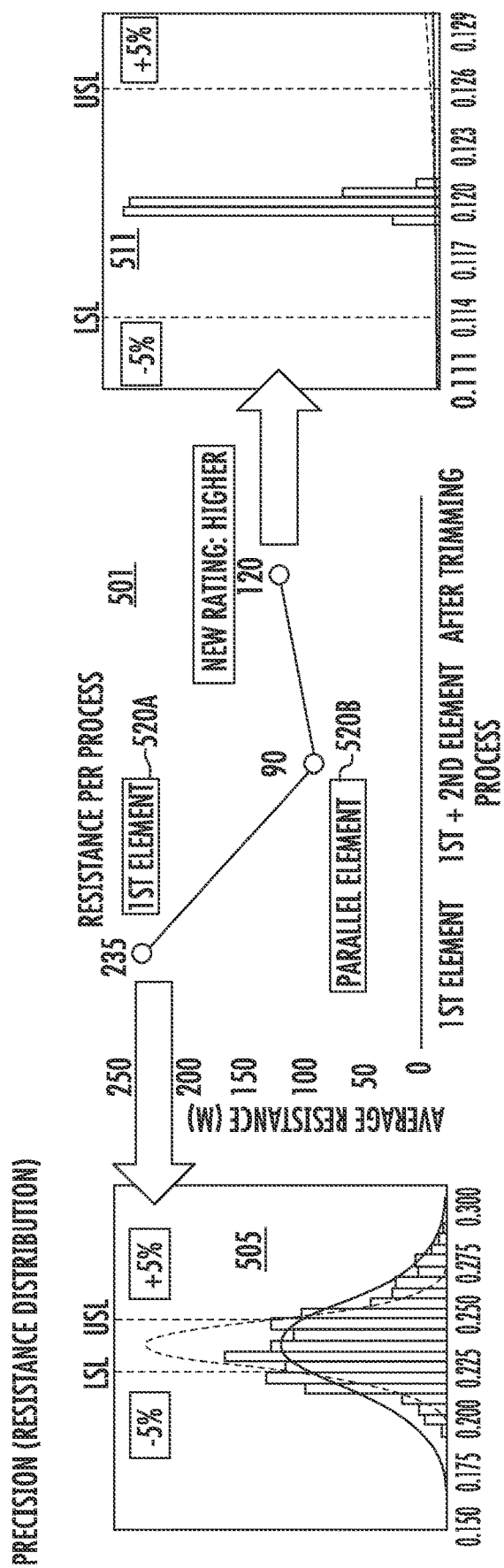

PROTECTION DEVICE WITH LASER TRIMMED FUSIBLE ELEMENT

FIELD OF THE DISCLOSURE

The disclosure relates generally to circuit protection devices and, more particularly, to circuit protection devices with laser trimmed fusible elements.

BACKGROUND OF THE DISCLOSURE

Fuses, which are commonly used as electrical circuit protection devices, provide electrical connections between sources of electrical power and circuit components that are to be protected. Upon the occurrence of a specified fault condition in a circuit, such as an overcurrent condition, a fusible element can melt, or otherwise separate, to interrupt current flow in the circuit path. Protected portions of the circuit are thereby electrically isolated and damage to such portions may be prevented or at least mitigated.

One known issue with existing fuses is imprecise resistance. Thus, a need exists for an improved fuse with a more precise resistance tolerance. It is with respect to these and other considerations that the present improvements have been needed.

SUMMARY

In some embodiments, a protection device may include a substrate and first and second terminals at opposite ends of the substrate. The protection device may further include a first fusible and a second fusible element extending between the first and second terminals, wherein at least one of the first and second fusible elements includes a trimmed portion.

In some embodiments, a fusible device may include a substrate and first and second terminals at opposite ends of the substrate. The fusible device may further include a first fusible and a second fusible element extending between the first and second terminals, wherein at least one of the first and second fusible elements includes a trimmed portion including one or more recesses formed into an exterior surface.

BRIEF DESCRIPTION OF THE DRAWINGS

The accompanying drawings illustrate exemplary approaches of the disclosure, including the practical application of the principles thereof, and in which:

FIGS. 5A-5C are charts depicting resistance values achievable using the protection devices of the present disclosure.

Figure 1A:
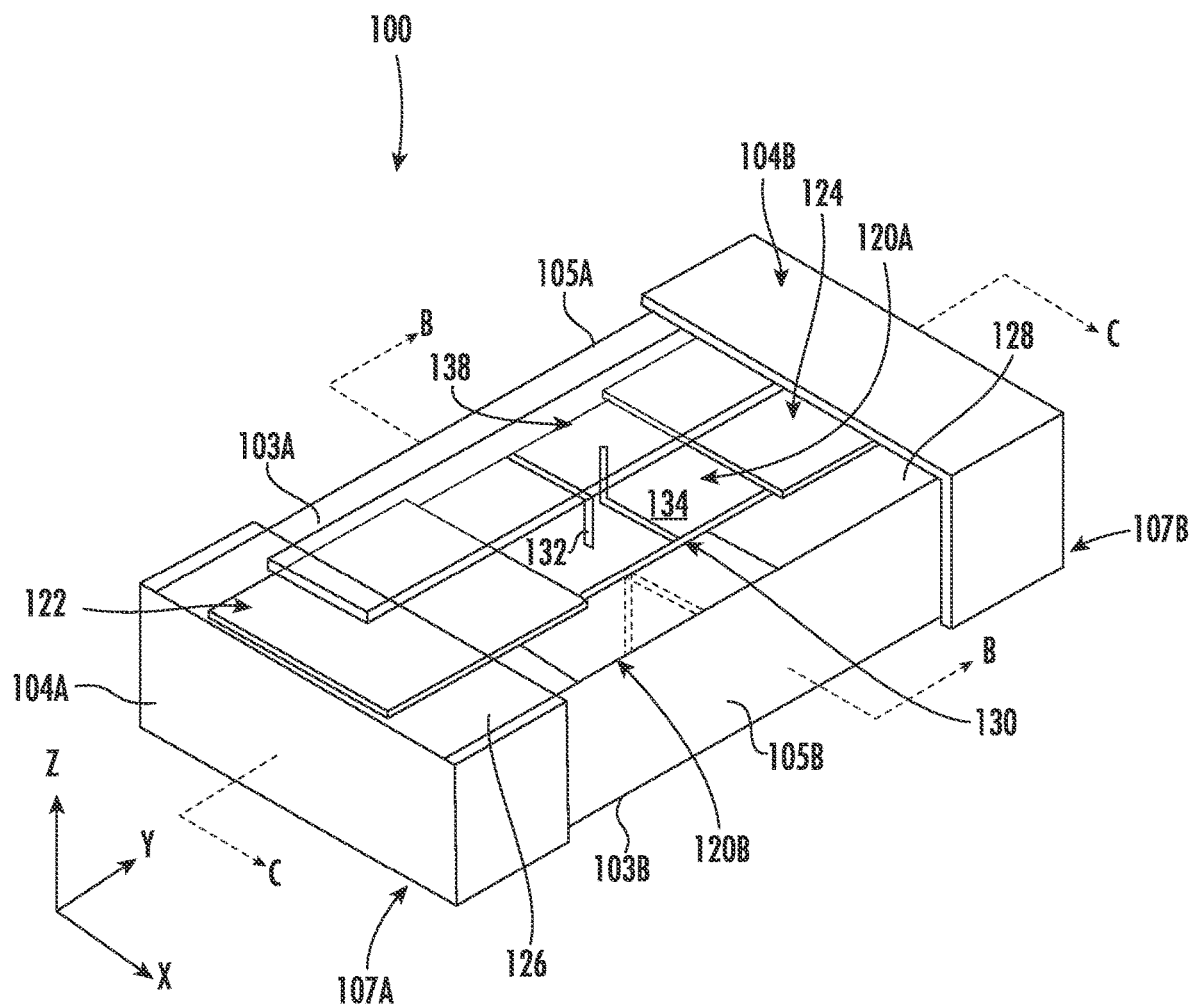
FIG. 1A is a perspective view of a protection device according to exemplary embodiments of the present disclosure.

The drawings are not necessarily to scale. The drawings are merely representations, not intended to portray specific parameters of the disclosure. The drawings are intended to depict typical embodiments of the disclosure, and therefore should not be considered as limiting in scope. In the drawings, like numbering represents like elements.

Furthermore, certain elements in some of the figures may be omitted, or illustrated not-to-scale, for illustrative clarity. Cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Fuse apparatuses and assemblies in accordance with the present disclosure will now be described more fully hereinafter with reference to the accompanying drawings, in which embodiments of the system and method are shown. The fuse apparatuses and assemblies, however, may be embodied in many different forms and should not be construed as being limited to the embodiments set forth herein. Rather, these embodiments are provided so that this disclosure will be thorough and complete, and will fully convey the scope of the system and method to those skilled in the art.

Approaches herein provide protection devices including a rigid substrate (e.g., glazed ceramic substrate) printed with two parallel fusible elements, wherein at least one of the elements may be trimmed to precision. As a result, the protection device of the present disclosure makes resistance more precise (+/−5% tolerance), while retaining i2t or higher difference between the two parallel fusible elements.

Figure 1B:
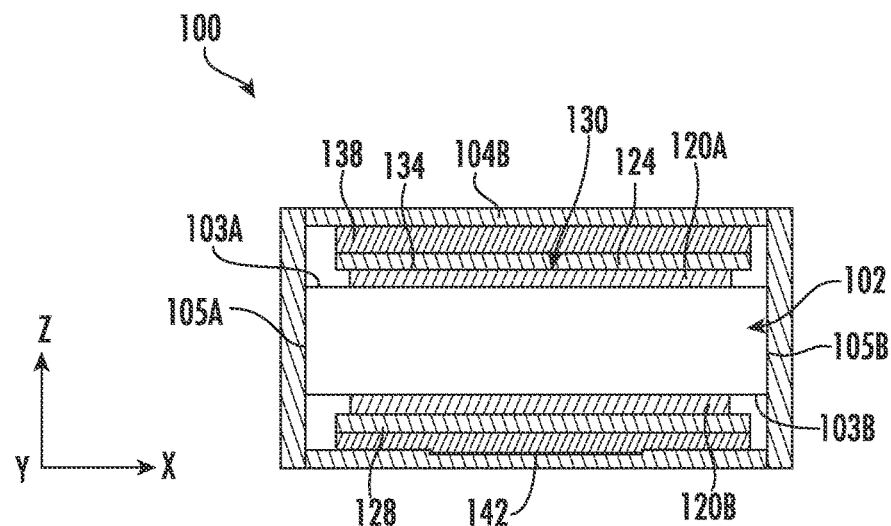
FIG. 1B is a side cross-sectional view, along cutline B-B, of the protection device of FIG. 1A according to exemplary embodiments of the present disclosure.
Figure 1C:
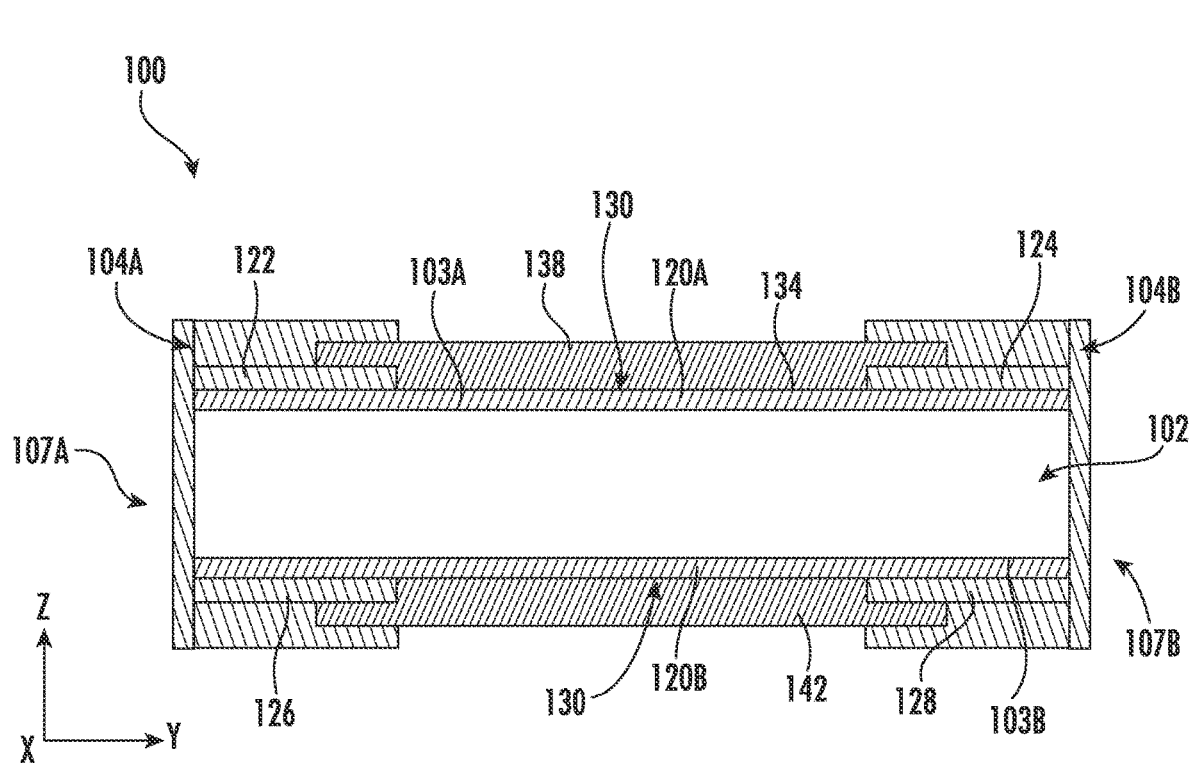
FIG. 1C is a side cross-sectional view, along cutline C-C, of the protection device of FIG. 1A according to exemplary embodiments of the present disclosure.

Referring to FIGs. 1A-1C, an exemplary embodiment of a fuse apparatus/assembly/device (hereinafter, "device") 100 in accordance with the present disclosure is shown. The exemplary device 100 may include a substrate 102, which may be a rigid glazed ceramic substrate defined by a first main side 103A opposite a second main side 103B, a first side 105A opposite a second side 105B, and a first end 107A opposite a second end 107B. As shown, the device 100 may further include a first terminal 104A formed about the first end 107A and a second terminal 104B formed about the second end 107B. In some embodiments, the first and second terminals 104A, 104B may be coupled to a printed circuit board (not shown).

The device 100 may further include a first fusible element 120A disposed along the first main side 103A of the substrate 102 and a second fusible element 120B disposed along the second main side 103B of the substrate 102. As shown, the first fusible element 120A may be connected to the first terminal 104A by a first lead 122 and connected to the second terminal 104B by a second lead 124. Similarly, the second fusible element 120B may be connected to the first terminal 104A by a third lead 126 and connected to the second terminal 104B by a fourth lead 128. The first and second fusible elements 120A, 120B may be electrically connected in parallel.

As best shown in FIG. 1A, the first and/or second fusible elements 120A, 120B may include a trimmed portion 130 formed therein. The trimmed portion 130 may include one or more recesses 132 formed into an exterior surface 134. The recesses 132 may be formed by laser trimming (e.g., ablation) so that the resistance value of the device 100 can be adjusted, as desired. Although non-limiting, the first and/or second fusible elements 120A, 120B may be trimmed in-situ, e.g., under live operating conditions. For example, a precise resistance value may be not be initially known or even of concern, but may need to be subsequently fine-tuned. In one non-limiting embodiment, a customer, a user, and/or the manufacturer may, for example, install the device 100 with an intentionally higher resistance, and then form the recesses 132 into the first and/or second fusible elements 120A, 120B until the exact resistance is generated, e.g., based on customer requirements.

As best shown in FIGS. 1B-1C, the first fusible element 120A may be formed directly atop the first main side 103A of the substrate 102, the first lead 122 and the second lead 124 may be formed directly atop the first fusible element 120, and a first glass layer 138 may be formed directly atop the first and second leads 122, 124 and the first fusible element 120A. As shown, the first terminal 104A and the second terminal 104B may be formed over a portion of the first glass layer 138. Although not shown, in some embodiments a solder may connect the first and second leads 122, 124 with respective first and second terminals 104A, 104B. In some embodiments, the first and second fusible elements 120A, 120B are made from gold.

Along the second main side 103B of the device, the third lead 126 and the fourth lead 128 may be formed along an exterior/bottom of the second fusible element 120B, and a second glass layer 142 may be formed along an exterior/bottom of the third and fourth leads 126, 128 and along the second fusible element 120B. As shown, the first terminal 104A and the second terminal 104B may be formed over a portion of the second glass layer 142.

Figure 2A:
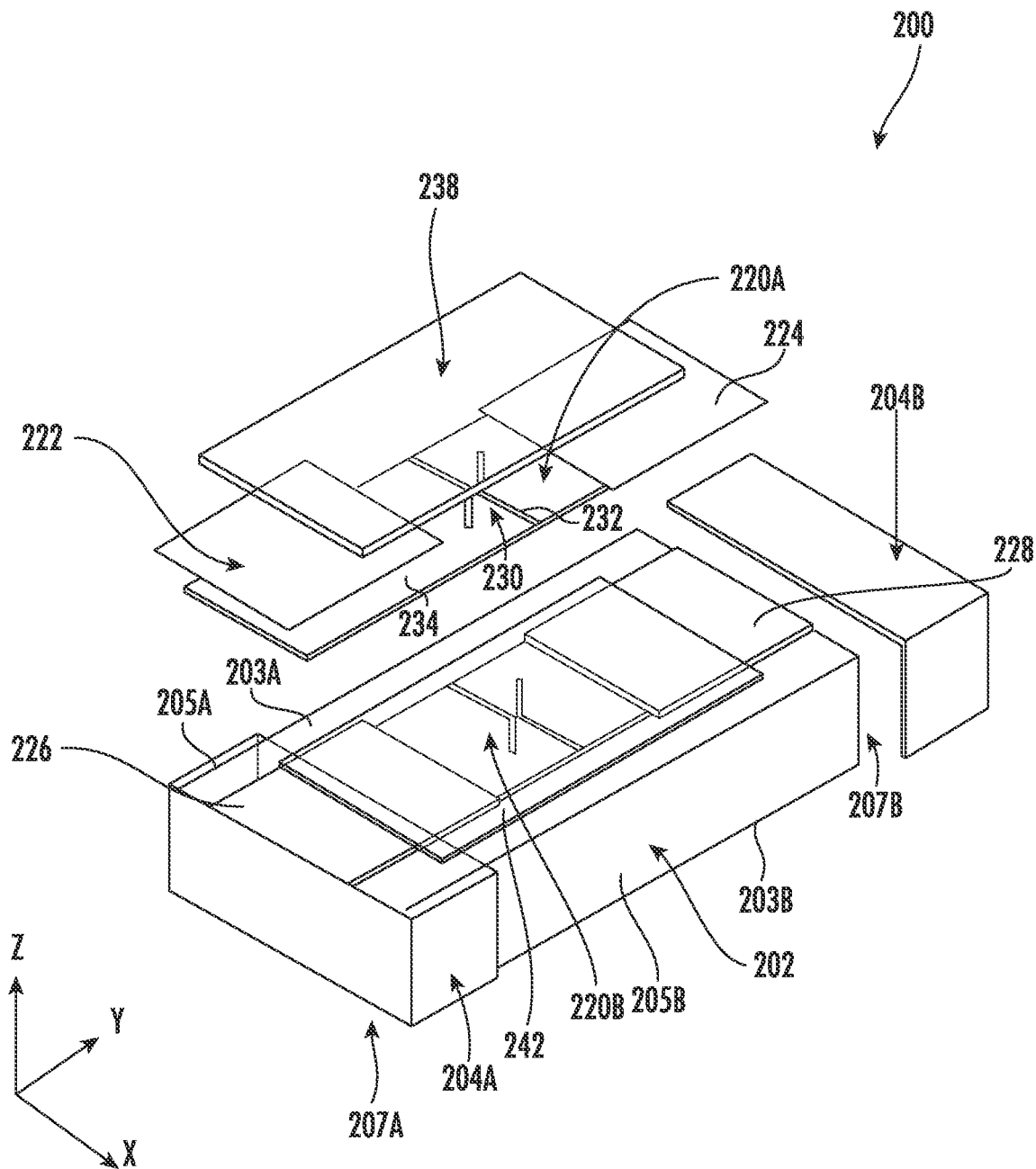
FIG. 2A is a perspective view of a protection device according to exemplary embodiments of the present disclosure.
Figure 2B:
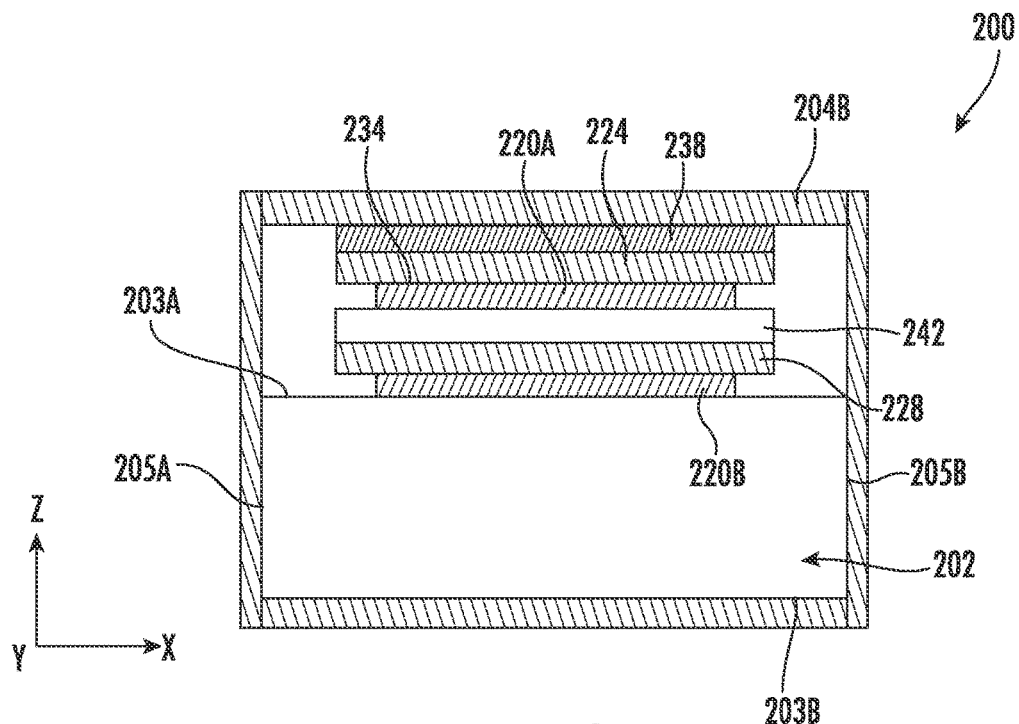
FIG. 2B is a side cross-sectional view of the protection device of FIG. 2A along a first cutline, according to exemplary embodiments of the present disclosure.
Figure 2C:
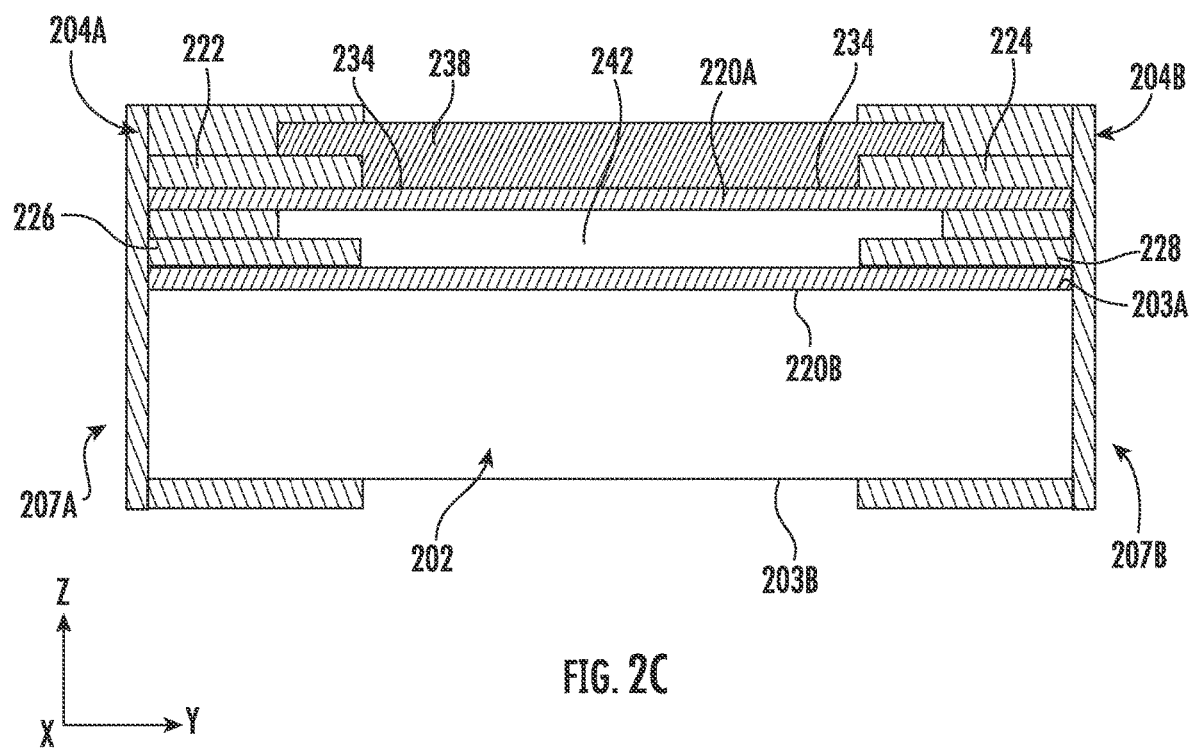
FIG. 2C is a side cross-sectional view of the protection device of FIG. 2A along a second cutline, according to exemplary embodiments of the present disclosure.

Referring to FIGS. 2A-2C, an exemplary embodiment of a fuse apparatus/assembly/device (hereinafter, "device") 200 in accordance with the present disclosure is shown. The exemplary device 200 may include a substrate 202, which may be a rigid glazed ceramic substrate defined by a first main side 203A opposite a second main side 203B, a first side 205A opposite a second side 205B, and a first end 207A opposite a second end 207B. As shown, the device 200 may further include a first terminal 204A formed about the first end 207A and a second terminal 204B formed about the second end 207B. In some embodiments, the first and second terminals 204A, 204B may be coupled to a printed circuit board (not shown).

The device 200 may further include a first fusible element 220A and a second fusible element 220B both disposed along the first main side 203A of the substrate 202. In some embodiments, the second fusible element 220B may be formed directly atop the substrate 202. As shown, the first fusible element 220A may be connected to the first terminal 204A by a first lead 222 and connected to the second terminal 204B by a second lead 224. Similarly, the second fusible element 220B may be connected to the first terminal 204A by a third lead 226 and connected to the second terminal 204B by a fourth lead 228. The first and third leads 222, 226 may be electrically connected by the first fusible element 220A, while the second and fourth leads 224, 228 may similarly be connected by the first fusible element 220A. Although not shown, a solder may be present to form the electrical connection therebetween such that the first and second fusible elements 220A, 220B are electrically connected in parallel. In some embodiments, the first and second fusible elements 220A, 220B are made from gold.

As best shown in FIG. 2A, the first and/or second fusible elements 220A, 220B may include a trimmed portion 230 formed therein. The trimmed portion 230 may include one or more recesses 232 formed into an exterior surface 234. The recesses 232 may be formed by laser trimming (e.g., ablation) so that the resistance value of the device 200 can be adjusted, as desired.

As best shown in FIGS. 2B-2C, the second fusible element 220B may be formed directly atop the first main side 203A of the substrate 202, while the third and fourth leads 226, 228 may be formed over a portion of the second fusible element 220B. A second glass layer 242 may be formed over the third lead 226, the fourth lead 228, and the second fusible element 220B, while the first and second leads 222, 224 are formed atop the second glass layer 242. A first glass layer 238 may be formed over the first and second leads 222, 224 and atop a portion of the first fusible element 220A. As shown, the first and second terminals 204A, 204B may be wrapped around the first lead 222, the second lead 224, and the first glass layer 238.

Figure 3A:
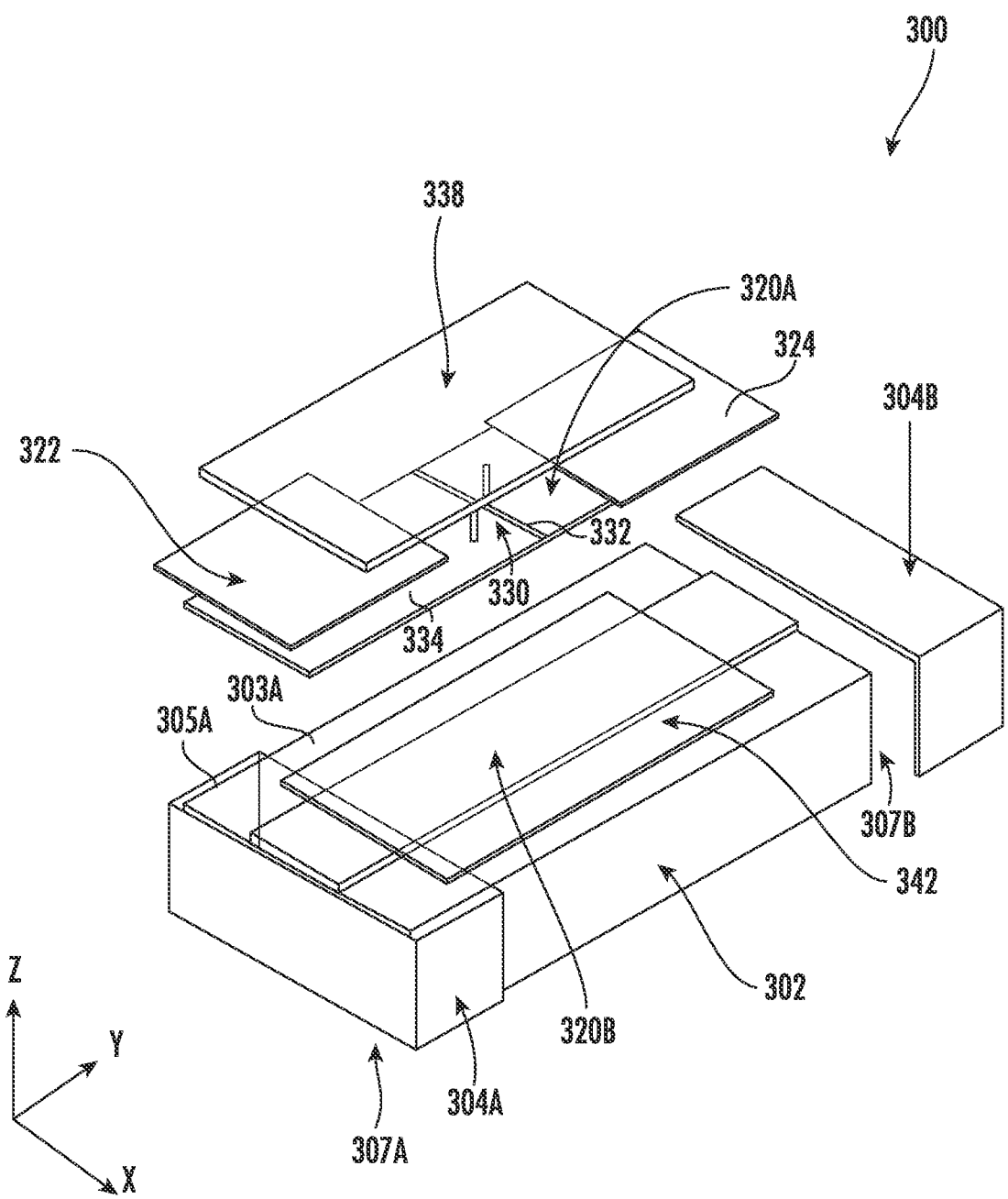
FIG. 3A is a perspective view of a protection device according to exemplary embodiments of the present disclosure.
Figure 3B:
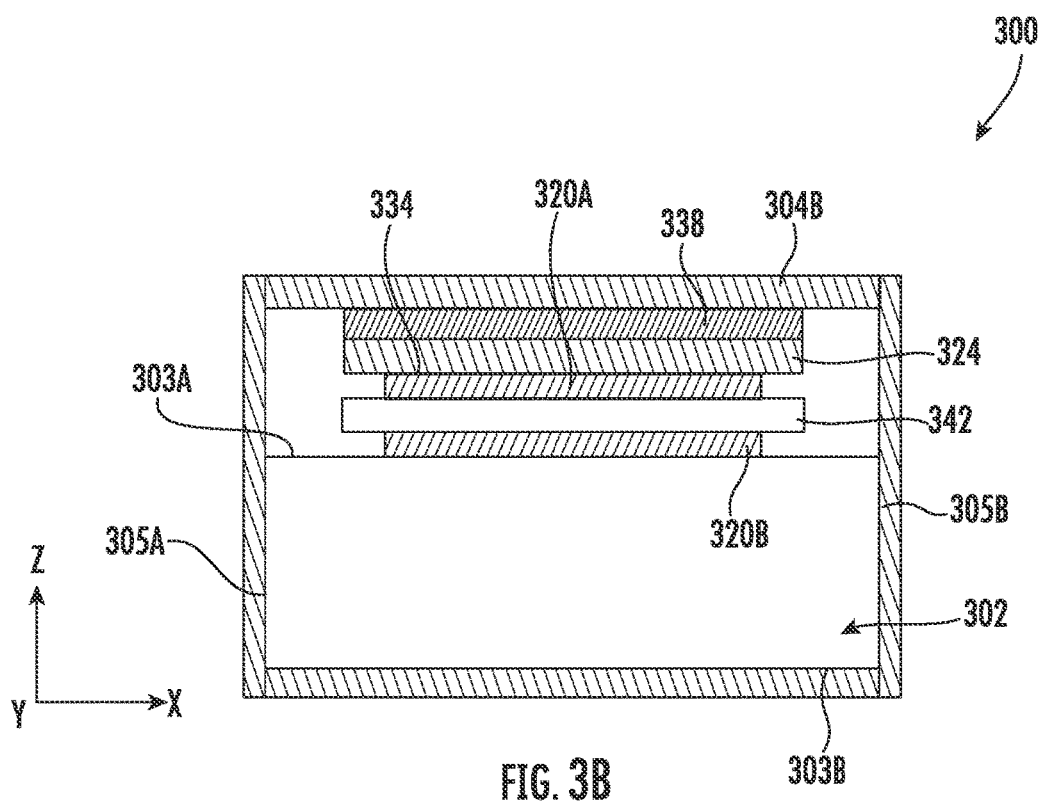
FIG. 3B is a side cross-sectional view of the protection device of FIG. 3A along a first cutline, according to exemplary embodiments of the present disclosure.
Figure 3C:
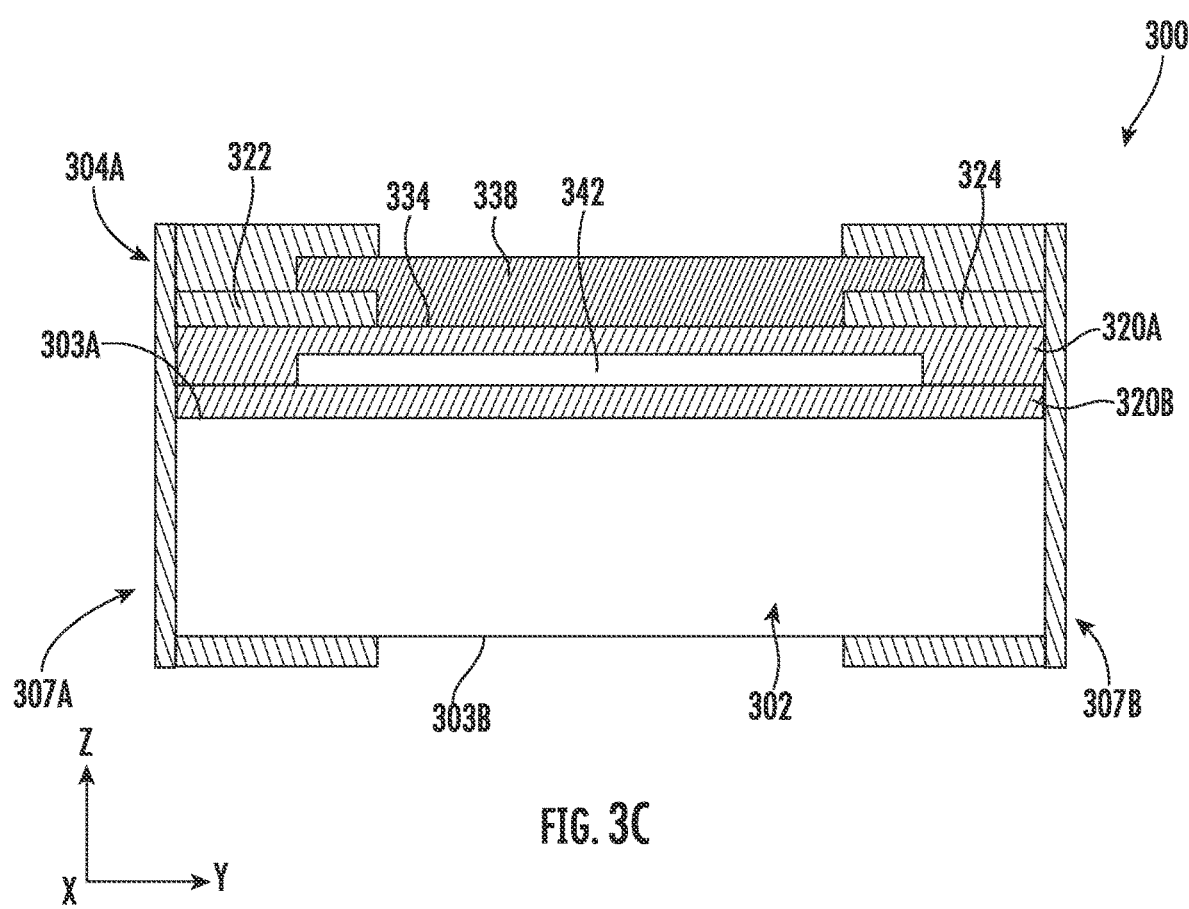
FIG. 3C is a side cross-sectional view of the protection device of FIG. 3A along a second cutline, according to exemplary embodiments of the present disclosure.

Referring to FIGS. 3A-3C, an exemplary embodiment of a fuse apparatus/assembly/device (hereinafter, "device") 300 in accordance with the present disclosure is shown. The exemplary device 300 may include a substrate 302, which may be a rigid glazed ceramic substrate defined by a first main side 303A opposite a second main side 303B, a first side 305A opposite a second side 305B, and a first end 307A opposite a second end 307B. As shown, the device 300 may further include a first terminal 304A formed about the first end 307A and a second terminal 304B formed about the second end 307B.

The device 300 may further include a first fusible element 320A and a second fusible element 320B both disposed along the first main side 303A of the substrate 302. In some embodiments, the second fusible element 320B may be formed directly atop the substrate 302. As shown, the first fusible element 320A may be connected to the first terminal 304A by a first lead 322 and connected to the second terminal 304B by a second lead 324. In this embodiment, the second fusible element 320B may be directly connected to the first terminal 304A and to the second terminal 304B, e.g., by solder. In some embodiments, the first and second fusible elements 320A, 320B are made from gold.

As best shown in FIG. 3A, the first and/or second fusible elements 320A, 320B may include a trimmed portion 330 formed therein. The trimmed portion 330 may include one or more recesses 332 formed into an exterior surface 334. The recesses 332 may be formed by laser trimming (e.g., ablation) so that the resistance value of the device 300 can be adjusted, as desired.

As best shown in FIGS. 3B-3C, the second fusible element 320B may be formed directly atop the first main side 303A of the substrate 302, while a second glass layer 342 may be formed over the second fusible element 320B. The first fusible element 320A may be formed over in the second glass layer 320. As shown, the first and second fusible elements 320A, 320B may be in direct electrical and physical contact with one another. The first and second leads 322, 324 may be formed atop a portion of the first fusible element 320A, and a first glass layer 338 may be formed over the first fusible element 320A and a portion of first and second leads 322, 324. As shown, the first and second terminals 304A, 304B may be wrapped around the first lead 322, the second lead 324, and the first glass layer 338.

Figure 4A:
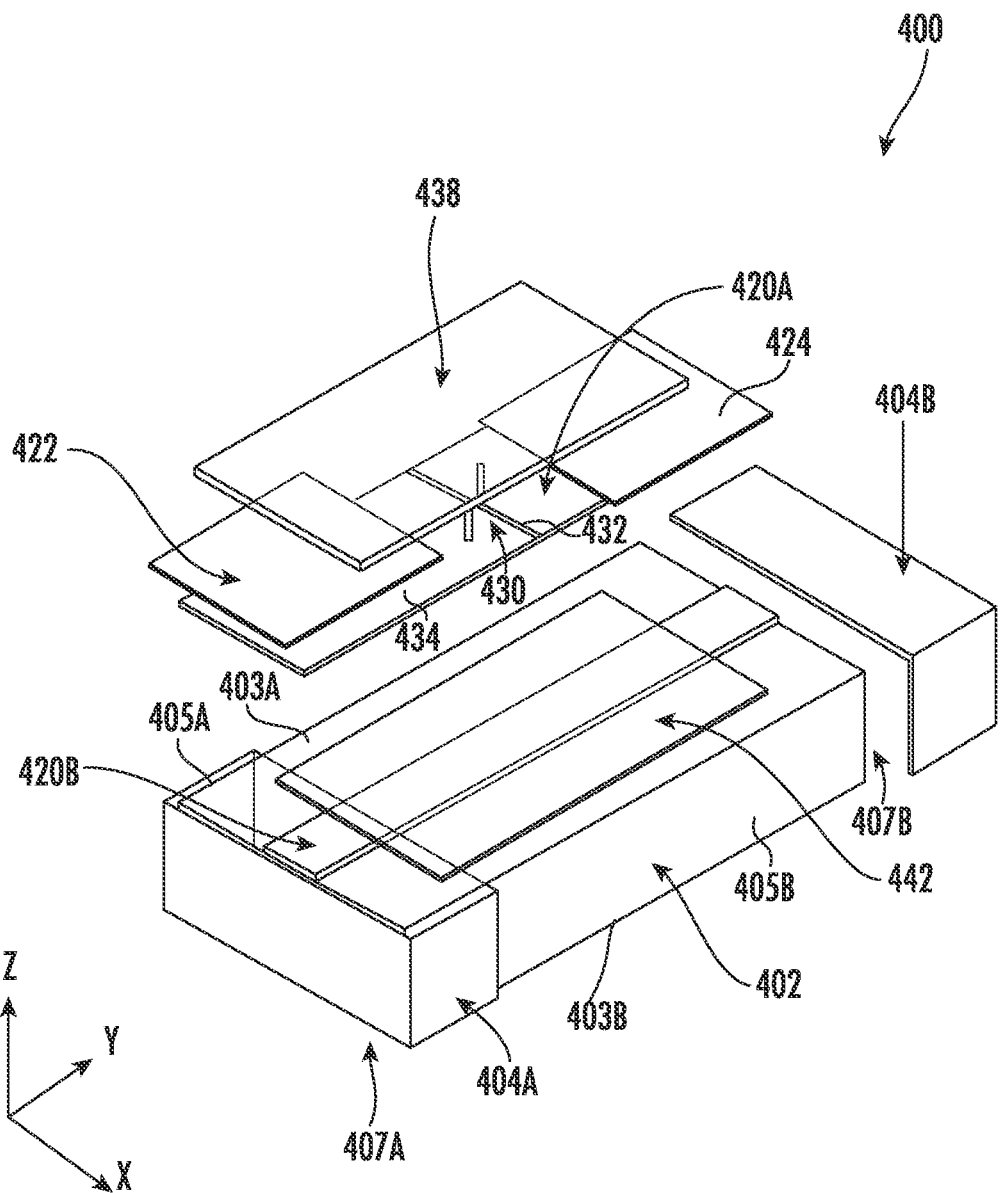
FIG. 4A is a perspective view of a protection device according to exemplary embodiments of the present disclosure.
Figure 4B:
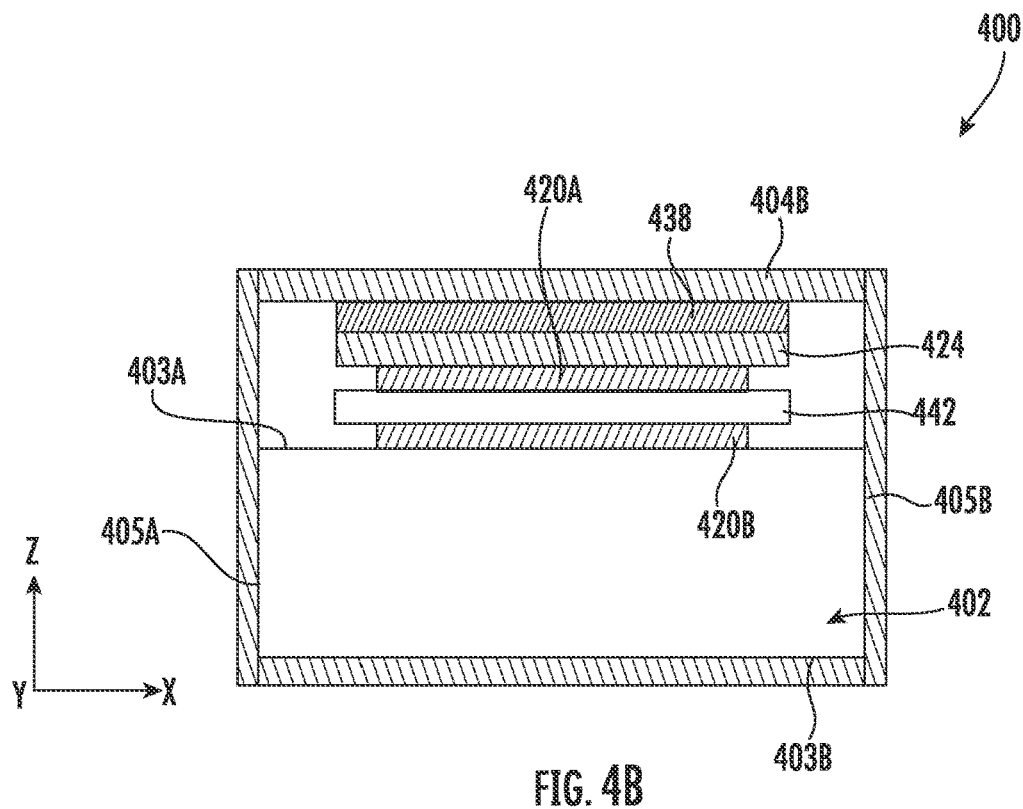
FIG. 4B is a side cross-sectional view of the protection device of FIG. 4A along a first cutline, according to exemplary embodiments of the present disclosure.
Figure 4C:
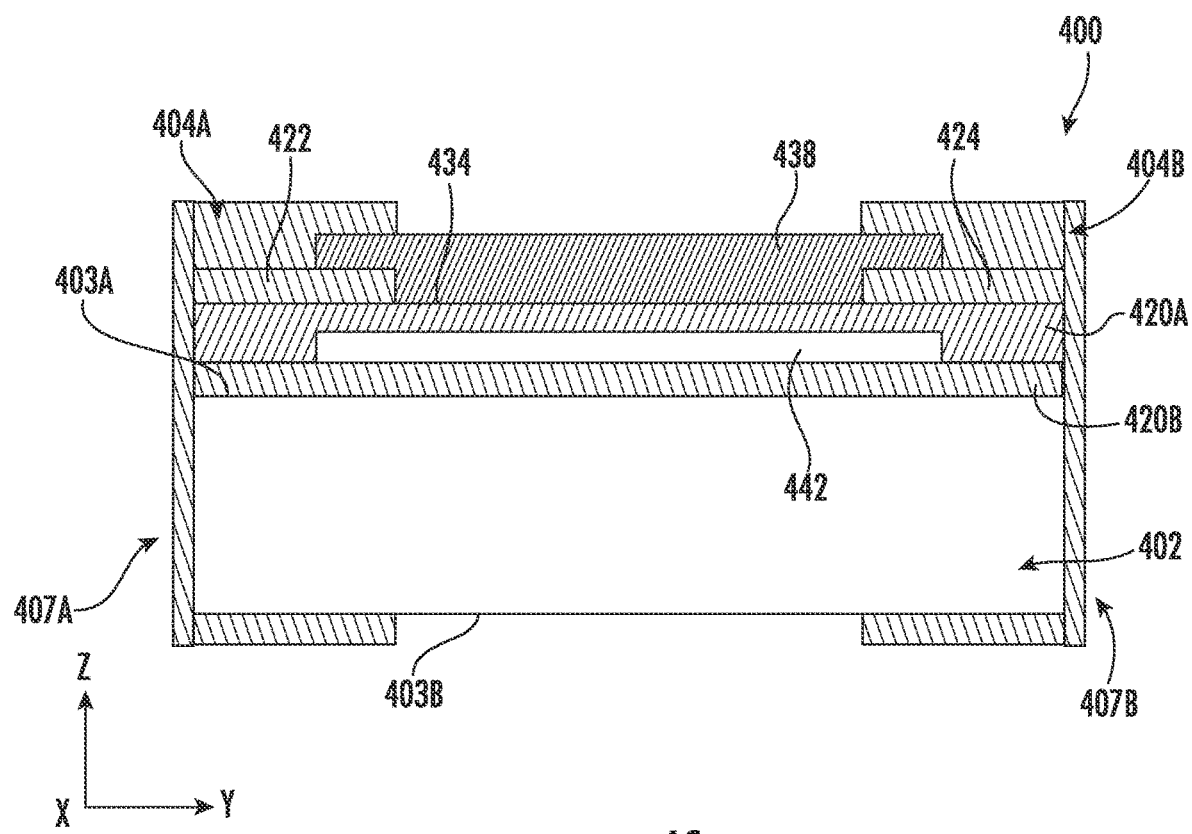
FIG. 4C is a side cross-sectional view of the protection device of FIG. 4A along a second cutline, according to exemplary embodiments of the present disclosure.

Referring to FIGS. 4A-4C, an exemplary embodiment of a fuse apparatus/assembly/device (hereinafter, "device") 400 in accordance with the present disclosure is shown. The exemplary device 400 may include a substrate 402, which may be a rigid glazed ceramic substrate defined by a first main side 403A opposite a second main side 403B, a first side 405A opposite a second side 405B, and a first end 407A opposite a second end 407B. As shown, the device 400 may further include a first terminal 404A formed about the first end 407A and a second terminal 404B formed about the second end 407B.

The device 400 may further include a first fusible element 420A and a second fusible element 420B both disposed along the first main side 403A of the substrate 402. In some embodiments, the second fusible element 420B may be formed directly atop the substrate 402. As shown, the first fusible element 420A may be connected to the first terminal 404A by a first lead 422 and connected to the second terminal 404B by a second lead 424. In this embodiment, the second fusible element 420B may be directly connected to the first terminal 404A and to the second terminal 404B, e.g., by solder. In some embodiments, the first fusible element 420A is made from gold and the second fusible element 420B is made from silver.

As best shown in FIG. 4A, the first and/or second fusible elements 420A, 420B may include a trimmed portion 430 formed therein. The trimmed portion 430 may include one or more recesses 432 formed into an exterior surface 434. The recesses 432 may be formed by laser trimming (e.g., ablation) so that the resistance value of the device 400 can be adjusted, as desired.

As best shown in FIGS. 4B-4C, the second fusible element 420B may be formed directly atop the first main side 403A of the substrate 402, while a second glass layer 442 may be formed over the second fusible element 420B. The first fusible element 420A may be formed over in the second glass layer 420. As shown, the first and second fusible elements 420A, 420B may be in direct electrical and physical contact with one another. The first and second leads 422, 424 may be formed atop a portion of the first fusible element 420A, and a first glass layer 438 may be formed over the first fusible element 420A and a portion of first and second leads 422, 424. As shown, the first and second terminals 404A, 404B may be wrapped around the first lead 422, the second lead 424, and the first glass layer 438.

Turning now to FIGS. 5A-5C, improvements to the resistance of the devices of the present disclosure will be further described. In FIG. 5A, a chart 501 demonstrating average resistance for a pair of fusible elements 520A, 520B is shown. It will be appreciated that fusible elements 520A, 520B may be the same as the fusible elements described herein with respect to devices 100, 200, 300, and 400. The initial distribution 505, shown in FIG. 5B, of the first fusible element 520A is wider using the precise limits of +−5%. After printing the second fusible element 520B, the first and second fusible elements 520A, 520B will be in parallel, thus the resistance will be significantly lower. Using the laser trimming process for the pair of fusible elements 520A, 520B, the resistance may be trimmed within the precise limits of +−5%. As demonstrated in the distribution 511 of FIG. 5C, the resistance after trimming will be lower than the initial resistance of the first element 520A, making the rating higher.

Figure 6:
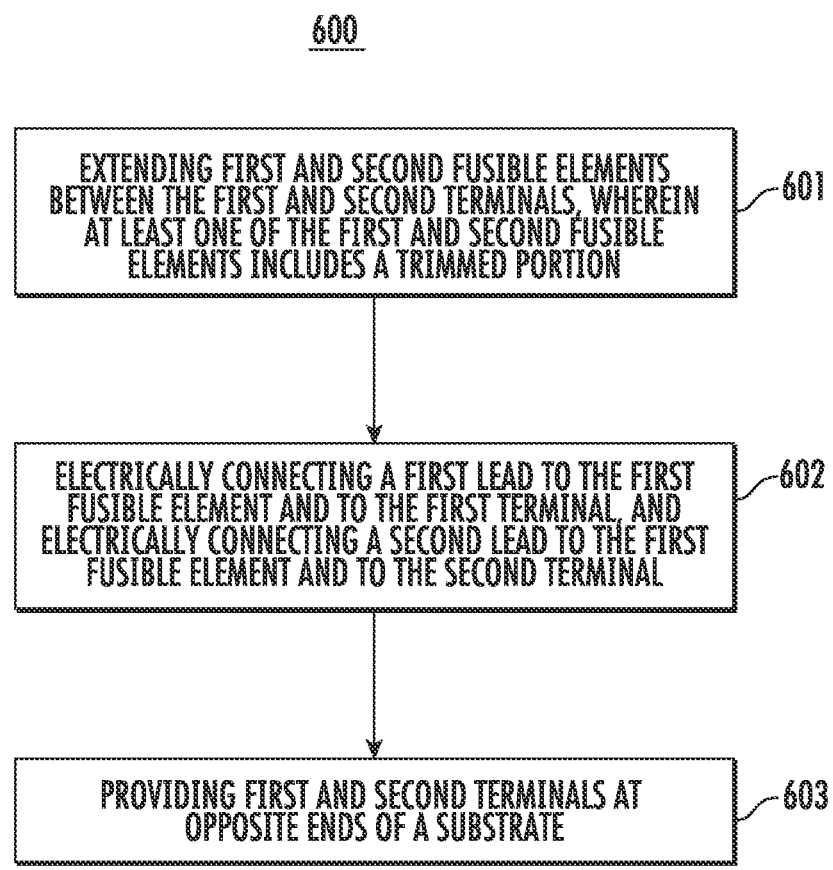
FIG. 6 is a flow chart of a method according to exemplary embodiments.

Turning now to FIG. 6, a method 600 according to embodiments of the present disclosure will be described. At block 601, the method 600 may include forming a device by extending first and second fusible elements between the first and second terminals, wherein at least one of the first and second fusible elements includes a trimmed portion. In some embodiments, the device includes a substrate, such as a rigid ceramic substrate. In some embodiments, the substrate includes a first main side opposite a second main side, wherein the first fusible element is positioned along the first main side of the substrate and the second fusible element is positioned along the second main side of the substrate. In some embodiments, the first fusible element and the second fusible element are positioned along the first main side of the substrate. In some embodiments, the first and second fusible elements are arranged electrically in parallel. In some embodiments, the trimmed portion may include one or more recesses formed into an exterior surface. The recesses may be formed by laser trimming (e.g., ablation) so that the resistance value of the device can be adjusted, as desired. In some embodiments, the first and second fusible elements are formed from gold. In some embodiments, the first fusible element is made from gold and the second fusible element is made from silver.

At block 602, the method 600 may further include electrically connecting a first lead to the first fusible element and to the first terminal, and electrically connecting a second lead to the first fusible element and to the second terminal. In some embodiments, a third lead may electrically connect the second fusible element to the first terminal, while a fourth lead may electrically connect the second fusible element to the second terminal.

At block 603, the method may further include providing first and second terminals at opposite ends of a substrate.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

Furthermore, the terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. A protection device, comprising:
   a substrate;
   first and second terminals at opposite ends of the substrate;
   a first fusible element and a second fusible element extending between the first and second terminals, wherein at least one of the first and second fusible elements includes a trimmed portion, and wherein the second fusible element is formed atop the substrate;
   a first glass layer and a second glass layer positioned along a first main side of the substrate, wherein the first glass layer and the second glass layer are positioned over the second fusible element, and wherein the first fusible element is positioned between the first glass layer and the second glass layer; and
   a first lead and a second lead positioned along the first main side of the substrate, wherein the first lead electrically connects the first fusible element to the first terminal, wherein the second lead electrically connects the first fusible element to the second terminal, and wherein the first lead and the second leads are formed directly atop the first fusible element.

2. The protection device of claim 1, further comprising:
   a third lead electrically connecting the second fusible element to the first terminal; and
   a fourth lead electrically connecting the second fusible element to the second terminal.

3. The protection device of claim 2, wherein the substrate includes the first main side opposite a second main side.

4. The protection device of claim 3, wherein the first fusible element and the second fusible element are positioned along the first main side of the substrate.

5. The protection device of claim 2, wherein the second glass layer is positioned over the third and fourth leads.

6. The protection device of claim 1, wherein the first and second fusible elements are formed from gold.

7. The protection device of claim 1, wherein the first fusible element is formed from gold and the second fusible element is formed from silver.

8. A fusible device, comprising:
   a substrate;
   first and second terminals at opposite ends of the substrate;
   a first fusible element and a second fusible element extending between the first and second terminals, wherein at least one of the first and second fusible elements includes a trimmed portion including one or more recesses formed into an exterior surface, and wherein the second fusible element is formed atop the substrate;
   a first glass layer and a second glass layer positioned along a first main side of the substrate, wherein the first glass layer and the second glass layer are positioned over the second fusible element, and wherein the first fusible element is positioned between the first glass layer and the second glass layer;
   a first lead and a second lead positioned along the first main side of the substrate, wherein the first lead electrically connects the first fusible element to the first terminal, wherein the second lead electrically connects the first fusible element to the second terminal, and wherein the first lead and the second leads are formed directly atop the first fusible element.

9. The fusible device of claim 8, further comprising:
   a third lead electrically connecting the second fusible element to the first terminal; and
   a fourth lead electrically connecting the second fusible element to the second terminal.

10. The fusible device of claim 9, wherein the substrate includes the first main side opposite a second main side.

11. The fusible device of claim 10, wherein the first fusible element and the second fusible element are positioned along the first main side of the substrate.

12. The fusible device of claim 10, wherein the first glass layer is positioned over the first and second leads.

13. The fusible device of claim 12, wherein the second glass layer is positioned beneath the first fusible element.

14. The fusible device of claim 8, wherein the first fusible element is formed from gold, and wherein the second fusible element is formed from gold or silver.

* * * * *